US012754982B2

(12) United States Patent
Ailawadi et al.

(10) Patent No.: US 12,754,982 B2
(45) Date of Patent: Oct. 6, 2026

(54) ADAPTIVE LANGUAGE MODEL-BASED SOLUTION FOR INTERACTIVE SECURITY AND SAFETY WITH DATA PRIVACY

(71) Applicant: AlertEnterprise, Inc., Fremont, CA (US)

(72) Inventors: Yogesh Ailawadi, Mountain House, CA (US); Navjot Singh, Chandigarh (IN); Mohit Kumar, Chandigarh (IN); Ribhav Jain, Chandigarh (IN)

(73) Assignee: ALERTENTERPRISE, INC., Fremont, CA (US)

( * ) Notice: Subject to any disclaimer, the term of this patent is extended or adjusted under 35 U.S.C. 154(b) by 169 days.

(21) Appl. No.: 18/905,069

(22) Filed: Oct. 2, 2024

(65) Prior Publication Data

US 2025/0028794 A1 Jan. 23, 2025

Related U.S. Application Data

(63) Continuation of application No. 18/615,747, filed on Mar. 25, 2024, now Pat. No. 12,135,768.

(60) Provisional application No. 63/492,572, filed on Mar. 28, 2023.

(51) Int. Cl.
*G06F 21/31* (2013.01)
*G06F 8/33* (2018.01)

(52) U.S. Cl.
CPC ................ *G06F 21/31* (2013.01); *G06F 8/33* (2013.01)

(58) Field of Classification Search
None
See application file for complete search history.

(56) References Cited

U.S. PATENT DOCUMENTS

| | | | |
|---|---|---|---|
| 9,436,681 | B1 | 9/2016 | Tunstall-pedoe et al. |
| 10,592,504 | B2 | 3/2020 | Moreno et al. |
| 11,593,364 | B2 | 2/2023 | Nahamoo et al. |
| 11,726,994 | B1 | 8/2023 | Wang et al. |
| 11,755,181 | B2 | 9/2023 | Burd et al. |
| 2021/0173829 | A1 | 6/2021 | Zeng et al. |
| 2021/0191925 | A1 | 6/2021 | Sianez |
| 2021/0216576 | A1 | 7/2021 | Staub et al. |

(Continued)

OTHER PUBLICATIONS

Alohaly et al.; "Integrating Cyber Deception Into Attribute-Based Access Control (ABAC) for Insider Threat Detection", 2022, IEEEAccess, pp. 108965-108978. (Year: 2022).

(Continued)

*Primary Examiner* — Paul R Fisher
(74) *Attorney, Agent, or Firm* — ASHURST PERKINS COIE US LLP

(57) ABSTRACT

An interface provides answers to natural language user queries based upon real time data generated by live processes. The natural language queries are converted into a machine query syntax and the machine query syntax is provided to a large language model without sharing underlying data that is used to satisfy the natural language query by serving the data to the end user while, at the same time, masking the data from large language model, where interaction with the large language model is based upon a predefined syntax protocol. A reply is a received from the large language model in the same syntax and the reply is used to create an output to be served to the end user and/or to execute a functionality.

11 Claims, 6 Drawing Sheets

(56) References Cited

U.S. PATENT DOCUMENTS

| | | | | |
|---|---|---|---|---|
| 2022/0253871 | A1* | 8/2022 | Miller | G06F 16/36 |
| 2023/0237053 | A1 | 7/2023 | Dangoor et al. | |
| 2023/0315722 | A1 | 10/2023 | Saxe et al. | |
| 2023/0315856 | A1 | 10/2023 | Lee et al. | |
| 2024/0004907 | A1 | 1/2024 | Dana et al. | |
| 2024/0062021 | A1 | 2/2024 | Tangari et al. | |
| 2024/0134850 | A1 | 4/2024 | Xu et al. | |
| 2024/0134865 | A1 | 4/2024 | Bierner et al. | |
| 2024/0220489 | A1 | 7/2024 | Chouta et al. | |
| 2024/0273309 | A1* | 8/2024 | Heller | G06F 40/186 |
| 2025/0117195 | A1* | 4/2025 | Rieken | G06F 8/33 |
| 2025/0165775 | A1* | 5/2025 | Sathianathan | G06F 8/76 |

OTHER PUBLICATIONS

Attawar etal; "NLSQL: Generating and Executing SQL Queries via Natural Using Large Language Models", 2023, IEEE, pp. 1-6. (Year: 2023).

Chatterjee et al.; "Automated Question-Answering for Interactive Decision Support in Operations & Maintenance of Wind Turbines", 2022, IEEEAccess, pp. 84710-84737. (Year: 2022).

Function Calling https://platform.openai.com/docs/guides/function-calling—Open A1 API—2024 (5 pages).

Gaaloul et al.; "Secure Governance in Enterprise Architecture—Access Control Perspective", 2013, IEEE, pp. 1-6. (Year: 2013).

Guo et al.; "XData: A General-purpose Unified Processing System for Data Analysis and Machine Learning", 2021, IEEE, pp. 26-31. (Year: 2021).

Ranade et al.; "CyBERT: Contextualized Embeddings for the Cybersecurity Domain", 2021, IEEE International Conference on Big Data (Big Data), pp. 3334-3342. (Year: 2021).

Tran et al.; "SPBERT: an Efficient Pre-training BERT on SPARQL Queries for Question Answering over Knowledge Graphs", 2021, ICONIP, LNCS 13108, pp. 512-523. (Year: 2021).

Xusheng et al.; "Research on BERT-based Text2SQL Multi-task Learning", 2023, IEEE, pp. 864-868. (Year: 2023).

Ye et al.; "Chatbot Security and Privacy in the Age of Personal Assistants", 2020, IEEE, pp. 388-393. (Year: 2020).

Yeo, Hangu, "A Machine Learning Based Natural Language Question and Answering System for Healthcare Data Search using Complex Queries", 2018, IEEE, pp. 2467-2474. (Year: 2018).

* cited by examiner

ADAPTIVE LANGUAGE MODEL-BASED SOLUTION FOR INTERACTIVE SECURITY AND SAFETY WITH DATA PRIVACY

CROSS-REFERENCE TO RELATED APPLICATIONS

This application is a continuation of U.S. patent application Ser. No. 18/615,747, filed Mar. 25, 2024, which claims priority to provisional patent application Ser. No. 63/492,572, filed Mar. 28, 2023. The aforementioned applications are incorporated herein by reference in their entirety.

FIELD

Various of the disclosed embodiments concern an adaptive language model-based solution for interactive security and safety with data privacy.

BACKGROUND

The rapid proliferation of connected devices, digitization, and the increasing amount of data generated by them have created new challenges for security and safety management. Traditional approaches to managing these challenges have often been reactive, focusing on detecting and responding to incidents after they occur. However, this approach is not sufficient in today's fast-paced and dynamic environment to address the challenges in security convergence.

SUMMARY

Embodiments of the invention address the challenges to security and safety management posed by the rapid proliferation of connected devices, digitization, and the increasing amount of data generated by them by leveraging natural language processing and situational awareness to provide real time insights to users and by adapting to their diverse needs and preferences.

Embodiments of the invention empower users to make informed decisions that can prevent incidents from occurring. Furthermore, embodiments of the invention provide a unique value proposition that lies in its ability to hard fine-tune large language models to achieve near-perfect accuracy in recognizing user intent, even in the face of unpredictable outcomes generated by generative AI algorithms.

In particular, embodiments of the invention provide an interface to answer natural language user queries based upon real time data generated by live processes. The natural language queries are converted into a machine query syntax and the machine query syntax is provided to a large language model without sharing underlying data that is used to satisfy the natural language query by serving the data to the end user while, at the same time, masking the data from large language model, where interaction with the large language model is based upon a predefined syntax protocol. A reply is received from the large language model in the same syntax and the reply is used to create an output to be served to the end user and/or to execute a functionality.

DETAILED DESCRIPTION

Figure 1:
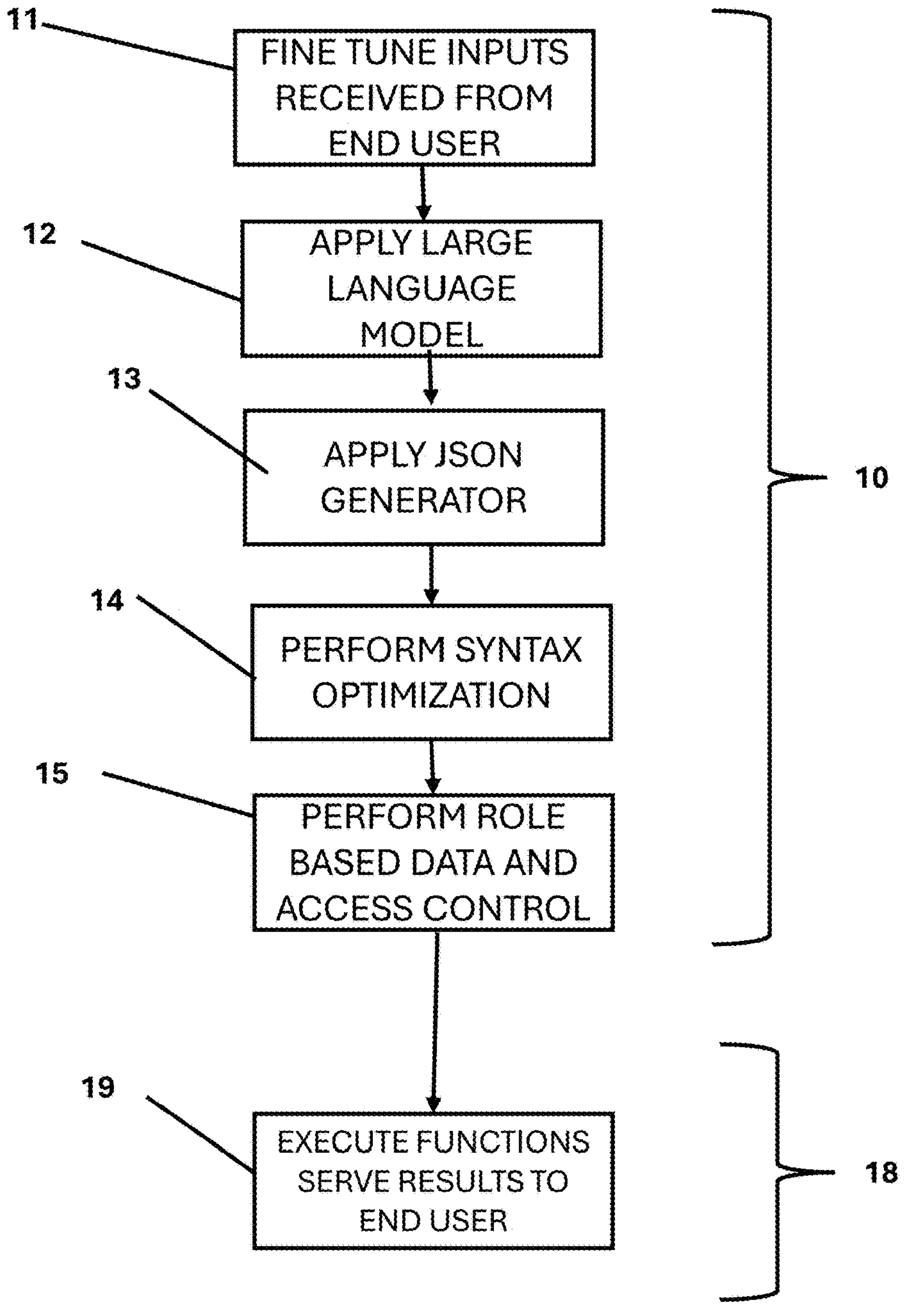
FIG. 1 is a flow diagram that shows an adaptive language model-based solution for interactive security and safety with data privacy according to an embodiment of the invention.

One of the primary challenges in applying traditional natural language processing solutions to sensitive areas such as security is the difficulty of building context awareness. Additionally, there has traditionally been a tradeoff between the scale and accuracy of natural language processing. Embodiments of the invention overcome these challenges by leveraging large language models and provide a unique approach that achieves near-perfect accuracy through hard fine-tuning. Embodiments of the invention perform at scale and in real-time, thus paving the way for numerous practical applications in various domains.

Embodiments of the invention adapt a large language model (LLM) for private applications such as an enterprise. While generative AI applications such as ChatGPT look at the entirety of big data, i.e. all of the Internet it is not useful to look at the cloud for a particular enterprise because the enterprise information is not found in the cloud, i.e. it is private information. Significantly, embodiments of the invention adapt a large language model for enterprise use.

Embodiments of the invention present a system which can understand end users' intent through a natural language interface and provide situational awareness to tackle security and safety challenges while managing the data privacy of end users. Situational awareness helps security personnel understand the security status of the entire organization and identify problems, abnormalities, and insights on other aspects in real time. This helps mitigate potential security or safety hazards, e.g.:

In the case of a situation where emergency evacuation is required from a building, the concerned authorities may want to know in real time what is the last known location of everyone. They may simply ask:

"Who all are present in the building" or.

"Send an emergency evacuation notice to all the visitors and employees in the building" or.

"What are the high risk incidents in the building"

and the system automatically detects the location of everyone from their browser or machine data to take real time actions or provide real time insights.

One unique value addition provided by embodiments of the invention is that it pinpoints to the exact insight which is useful for the end user in respective situations and presents that insight in an interactive way.

Core features of embodiments of the invention are capable of managing the challenges that occur with unpredictable results generated by generative AI algorithms in general. Embodiments of the invention leverage large language models to hard fine tune and to achieve near 100% accuracy.

In every security and safety scenario, access to the right information at the right time to the right stakeholder is key. In embodiments of the invention this is achieved using a chat interface which takes inputs in text, audio, or images and generates output in the form of text, speech, or interactive chats.

Using custom large language models for enterprise natural language processing applications is useful, but at the same time there is a drawback that it is necessary to expose private data to use large language models. Embodiments of the invention use a large language model and to convert NLP to SQL and also do so without sharing the underlying data that is used to satisfy the NLP query. Embodiments of the invention can convert the query into any syntax and the invention is not limited to the SQL syntax.

Embodiments of the invention categorize the problems of security convergence in three categories, i.e. Analytics, Self Service, and Recommendations.

FIG. 1 is a flow diagram that shows an adaptive language model-based solution for interactive security and safety with data privacy according to an embodiment of the invention. In FIG. 1, a preprocessing step 10 fine tunes inputs 11 taken from an end use through prompts. The inputs and prompts are then provided to a large language model 12. The output of the large language model is provided to a JSON generator 13 and syntax optimization 14 is then performed. Role based data and access control is determined 15. An execution step 18 then provides function execution and server side functionality 19 and serves the results to the end user via the user interface.

Analytics

Embodiments of the invention provide an interface that answers user questions based upon real time data generated by live processes in a business. It converts the natural language to database query syntax and brings the results to the user seamlessly.

Self Service

The fulfillment of requests in a timely manner and with accuracy is very important to keep organizations safe and secure, hence the self service requests module. This takes inputs from the end user and, based upon the role based permissions of the user, it raises requests to the relevant authorities along with serving the parts of request in real time which do not need approval.

Self-service addresses requests to the system for services provided by the enterprise to its employees. For example, self-service in invoked when an employee wants to request a badge, when somebody needs access, when they are traveling to a different site, when they want to update their emergency contact information, etc.

Embodiments of the invention use natural language processing (NLP). The user can ask any questions, e.g. they can ask what they need and the system gets immediately returns a responsive page to the user rather than requiring the user to click several different links and submit additional information. Thus, a page is returned to the user who then merely has to hit one button, review, and submit. This feature of the invention saves the user's time, saves the user's clicks and, based on natural language, allows the user to ask what he needs and the system then gets it in front of him.

Self-service can be extended further, e.g. to HR issues to answer such question as:

"How do I file an insurance claim?"

"How do I designate a different beneficiary on my retirement account?"

"I am travelling to building A and I need access to it for a week."

"Help me register a guest for the site visit."

Thus, rather than going through different menus and clicking those areas and searching, the user just asks for what he needs and gets a form automatically filled in while he waits. He then clicks review and submits the form. As such, embodiments of the invention provide a way to query an enterprise across disparate databases having different formats and locations.

Recommendations

While using insights from above mentioned modules a user might need to ask questions related to standard operating procedure on certain things. This module acts as an AI powered playbook and serves recommendations. This leverages large language models too and prompts are created in such a way that the model acts as virtual guide to the end users such as security guards, employees, or visitors, and the like.

A playbook provides a recommendation that is made when data stored in the enterprise is useful to address an immediate need or concern. For example, a user such as a security guard may query:

"I see a suspicious package in the parking lot. What should I do? What is the protocol of the enterprise for this situation?"

One solution is for the security guard to talk to his supervisor. Another solution is to find out what is in an enterprise manual, i.e. what is he supposed to do, because for every situation there is a playbook in every organization. In embodiments of the invention the security guard asks question to the AI, i.e.

"What should I do in this situation?"

The system then starts guiding him, e.g. do this, do this, talk to this person.

Assuming the enterprise has many offices in many states and countries there may be a different way to handle the situation based on local practice. In embodiments of the invention it is not necessary for a user to remember anything and nobody has to follow rule books. The user just asks a question and the system understands the context, e.g. it knows the location of the user who asked the question and provides an appropriate answer. The security guard in this example, noticing that there is a suspicious package in the parking lot, does not have to pull out the manual and start leafing through the manual and hope he can find an answer. The security guard simply queries the system:

"There's a suspicious package in the parking lot. What do I do?"

The query then is then propagated through all of the enterprise information and a geographically appropriate answer comes back instantly. Thus, there is typically a wealth of information that organizations usually have buried in their rulebooks, which they never follow because it is hard to access when needed, which comes in the form of a recommendation. Embodiments of the invention give recommendations. Further, the system learns from the user's colleagues who have responded to an event or similar events in the past. This information is added to the recommendations such that the recommendations are automatically improvised and improved.

When serving requests on the aforementioned modules the data privacy of the end user is a core issue. It is necessary to serve the data to the end user but, at the same time, mask that data from large language model service providers in embodiments of the invention where the third party large language model used is provided by organizations such OpenAI, Microsoft, Google, and others. Embodiments of the invention have a unique design which makes sure that only data definition language (DDL) data, and not data manipulation language (DML) data, is shared with the service providers. This is made possible by segregating the entire request to response flow in two parts, i.e.:

1) Generating an SQL Query; and

2) Executing the SQL Query to fetch the requested data.

Step 1 involves feeding DDL data such as table names, column names, and their relationship with each other to the LLMs so that the LLMs learn to generate accurate SQL queries/structured instructions.

Step 2 which fetches DML level data from the respective tables is executed without involving external LLM service providers. The internal application does this without sending any request or receiving any response from outside the enterprise network.

Generative AI, such as ChatGPT, provides answers to queries based on the public data, e.g. data which is available on the Internet. In embodiments of the invention, generative AI is used to generate answers to queries based on enterprise data stored in a proprietary application. Generative AI, such as ChatGPT, has an underlying engine referred to as a large language model. The large language model is provided as a service, for example by OpenAI and many other companies. Embodiments of the invention use a large language model to generate the syntax of the queries posed by user. For example when a query is posed the large language model provides a syntax which can be used on the user's enterprise data. For it to return the actual desired outcome the large language model's only role is to generate that syntax. It knows the structure of the tables or columns in the enterprise but it does not know what is inside the tables or columns. The contents of the tables and columns is processed by an internal application, a large language model API, and an enterprise database, all of which operate synchronously. While open AI or any other service provider for large language model may know what type of structure that is followed to store the data in the enterprise they do not know what the exact data is which is stored inside that structure.

Figure 2:
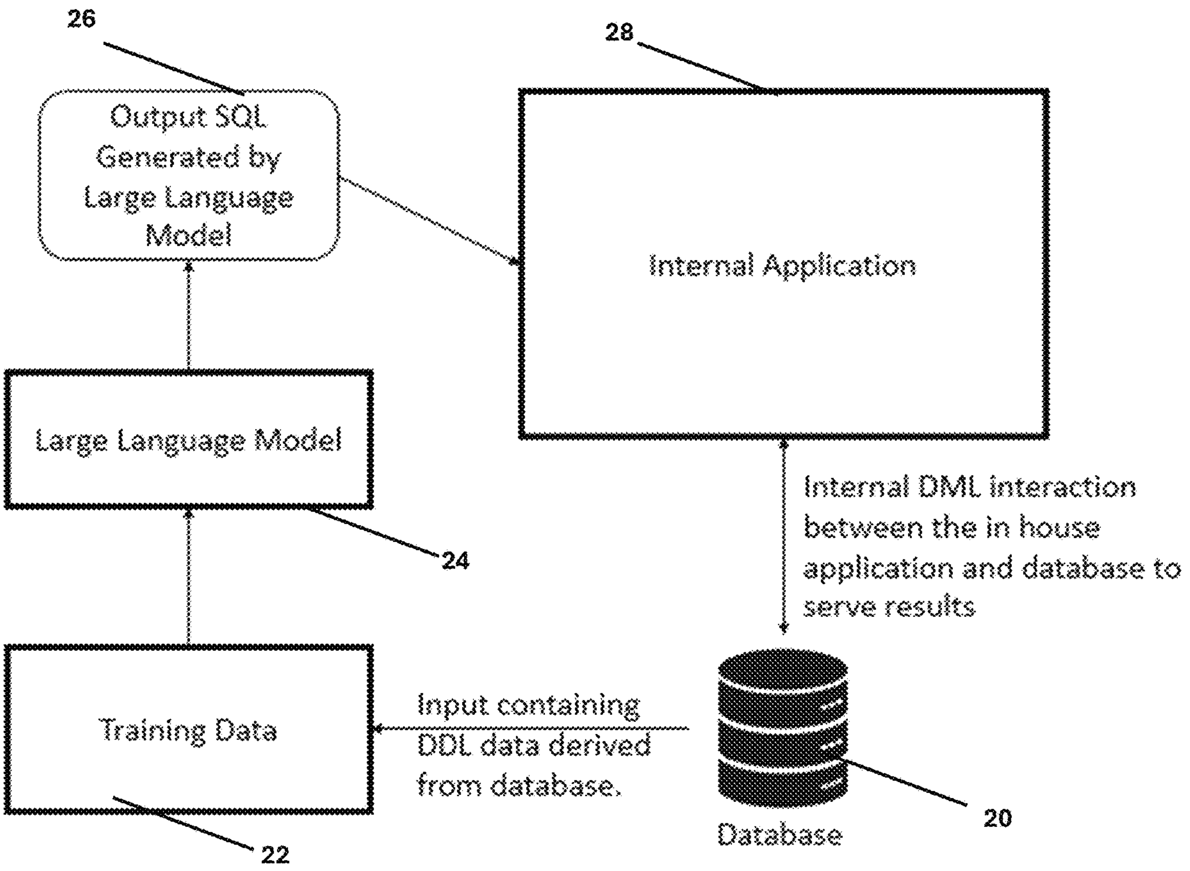
FIG. 2 is a block diagram that shows the use of a large language model to generate the syntax of the queries posed by user according to an embodiment of the invention.

FIG. 2 is a block diagram that shows the use of a large language model to generate the syntax of the queries posed by user according to an embodiment of the invention. In FIG. 2, a database 20 is a source DDL data that is used as input training data 22. The training data is used to train a large language model 24. Output SQL is generated by the large language model 26 and provided to an internal application 28. At this point, based on internal DML interaction between the internal application and the database, the internal application serves the query results.

Embodiments of the invention use OpenAI large language models. Those skilled in the art will appreciate that other models provided by other vendors may be used when practicing the invention. Significantly, the models are only used to generate the structure of the query. The actual data and the UI is secure in the enterprise and/or in a private application. The large language model is only used to generate the query syntax to make use of all the data that is available in the enterprise. Thus, as shown in FIG. 1, DDL level information, i.e. only SQL queries which contain names of tables, fields, and their relationships is fed into the LLM which is leveraged to generate structured queries. These queries when ingested in the internal application are processed internally and LLM is not involved in this part.

Embodiments of the invention serve real time insights for safety and security applications while maintaining privacy and accuracy at scale.

Some core features and important definitions are as follows:

Large Language Models

A large language model (LLM) is a language model consisting of a neural network with many parameters (typically billions of weights or more), trained on large quantities of unlabeled text using self-supervised learning. Large language models are sophisticated computer programs designed to understand and process human language. These models use complex algorithms and artificial intelligence techniques to analyze vast amounts of data and generate meaningful insights. In embodiments of the invention large language models from external service providers are leveraged and solutions are built on top of these models.

LLMs are very capable scientific models which can ingest and process huge volumes of data and present the insights from that data in a readily available format through a virtual chat, for example. This enables LLMs to gain some level of intelligence and capability to correlate and respond smartly in conversations as in real life interactions between human beings. While this innovation brings many benefits, it is not possible for enterprises to share data safely with the publicly available or privately served large language models.

Embodiments of the invention provide a technique through which large language models are fed only metadata. The inbuilt modules of the system interact with the internal software in an organization to process the requests by end users. These requests may comprise queries related to data or instructions to execute some action by the internal software. Embodiments of the invention use a novel technique to leverage LLMs to instruct any software or other systems which can take structured inputs, e.g. SQL databases, security operations, center alarm management system, etc.

Natural Language Input

Natural language input enables users to communicate with, e.g. Guardian Bot, an AI powered Discord security bot, using natural language, making it easy and intuitive to interact with the app. This saves time and reduces the learning curve for users, e.g. this feature allows users to ask pertinent questions such as:

How many incidents of force door opening have been reported since yesterday and what should be my top priority today to manage risks?

Voice and Image Input

Users can provide questions or queries in voice format using a microphone or an inbuilt microphone of the computer. The query can further be accompanied with an image to provide additional information, e.g. this feature allows users to query:

> Security camera send a footage/picture of an oil spill on the manufacturing floor. To whom should I report this as it could be a safety hazard for someone?

Context Retention

While talking to the system a user might expect it to remember the context of the last few questions and answers and ask follow-up questions. To support this the conversation always keeps intact all the nouns and other relevant parts of speech to achieve seamless context rich experience.

Data Privacy

In most of the business applications which leverage natural language processing capabilities of a third party service or public models such as open source large language models, a major bottleneck is the need to keep the data private while at the same time leveraging the same data to solve problems. Embodiments of the invention operate in a unique way to serve this need. Embodiments of the invention interact with the large language model (LLM) service providers based upon a predefined syntax protocol. A reply is received in the same syntax which is further used inside the internal system to create the actual output to be served to the users.

Hard Fine Tuning

Fine-tuning is the practice of modifying an existing pretrained language model by training it in a supervised fashion on a specific task, e.g. sentiment analysis, named entity recognition, or part-of-speech tagging. It is a form of transfer learning, i.e. a technique in machine learning (ML) in which knowledge learned from a task is re-used to boost performance on a related task. For example, for image classification, knowledge gained while learning to recognize cars could be applied when trying to recognize trucks.

Fine tuning a large language model involves adjusting the parameters or weights of a pre-trained model to adapt it to a new task. A simpler and more scalable way to do this is by using a few shot learning technique. Few shot learning involves providing very limited set of labelled data examples and using the original general purpose model for the desired use cases, e.g. to generate SQL in this case. When the input prompts are designed in such a way that few shot learning channelizes the output strictly to perform only desired task and nothing else. This technique is referred to herein as hard fine tuning. This allows the herein disclosed technique to build training data versatile enough to cover at least one example on every aspect of DDL data and precise enough to stay in the realm of few shot learning.

Figure 3:
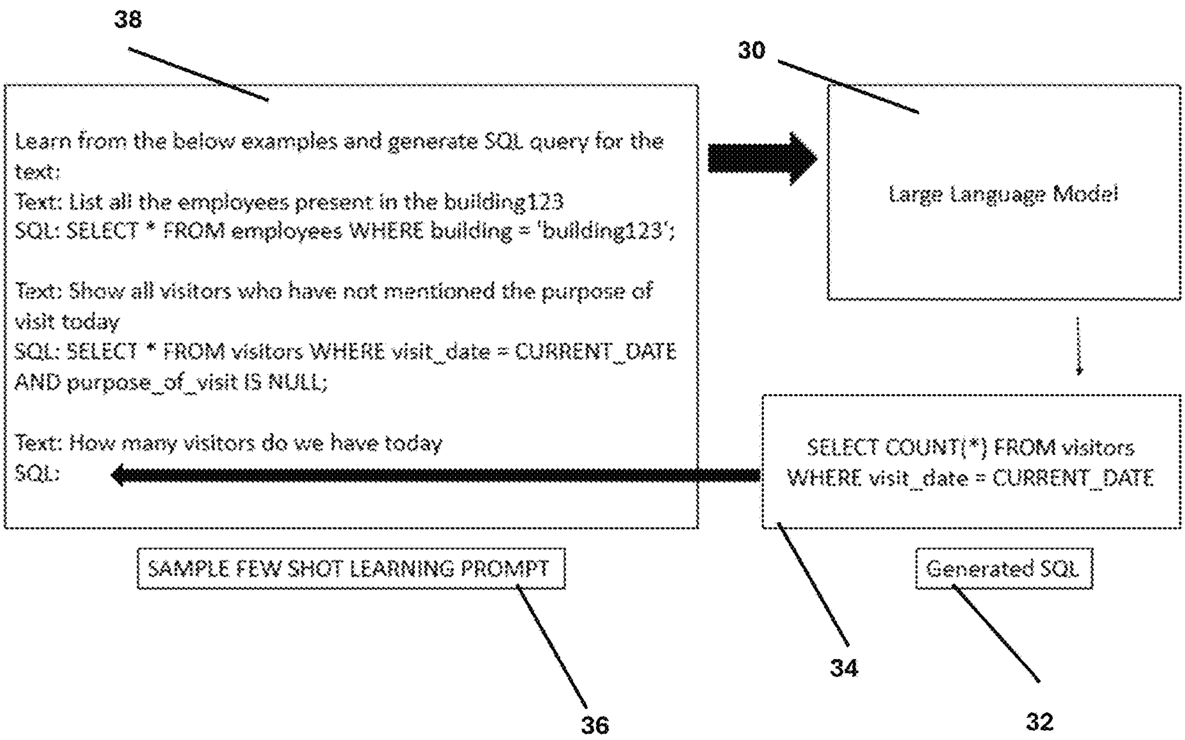
FIG. 3 is a flow diagram that shows a sample fine tuning exercise through few shot learning according to an embodiment of the invention.

FIG. 3 is a flow diagram that shows a sample fine tuning exercise through few shot learning according to an embodiment of the invention. In FIG. 3, generated SQL 32 from the large language model 30, e.g. at box 34:

```
SELECT COUNT(*) FROM visitors
WHERE visit_date = CURRENT_DATE
```

is provided as a few shot learning prompt 36, i.e. at box 38

Learn from the below examples and generate SQL query for the text:

```
Text: List all the employees present in the building123
SQL: SELECT * FROM visitors WHERE building = 'building123'
Text: Show all visitors who have mentioned the purpose of visit today
SQL: SELECT * FROM visitors WHERE visit_date = CURRENT_DATE
AND purpose_of_visit is NULL;
Text: How many visitors do we have today
SQL: SELECT COUNT(*) FROM visitors
WHERE visit date = CURRENT DATE
```

When using generative AI based large language models it becomes a challenge to contain the actual outcome of the models in a finite limit. This challenge is addressed in embodiments of the invention through hard fine tuning by preparing the prompts in such a way that the versatility of training data is syntactically contained in certain limits while contextually providing as many inputs as desired, e.g. in training, every prompt in text, voice, or through a supporting image has a respective structured query language (SQL) query so that the model is hard trained to generate SQL queries always, e.g.:

```
Text: How many people have entered in Buildingl in the last 6
hours
SQL: SELECT COUNT(DISTINCT user_id)
FROM dbschema.event e
INNER JOIN dbschema.asset a
```

-continued

```
ON e.asset_id= a.asset id
INNER JOIN dbschema.building b
ON a.building_id = b.building_id
WHERE b.building_name = 'Buildingl'
AND now( )- e.event_time <= INTERVAL '6 hours'
Text: Show me the risks I need to focus on right now in Buildingl
SQL: SELECT
incident_type,incident_time,building.building_name,
incident_status, priority, severity
FROM dbschema.incident
JOIN dbschema.asset ON dbschema.incident.asset____id =
dbschema.asset.asset_id
JOIN dbschema.building ON dbschema.asset.building_id =
dbschema.building.building_id
WHERE building.building_name = ’Buildingl’
AND incident_time >= now( ) – interval ‘24 hours’
AND incident status< >’CLOSED’
```

Statistical Layer

Figure 4:
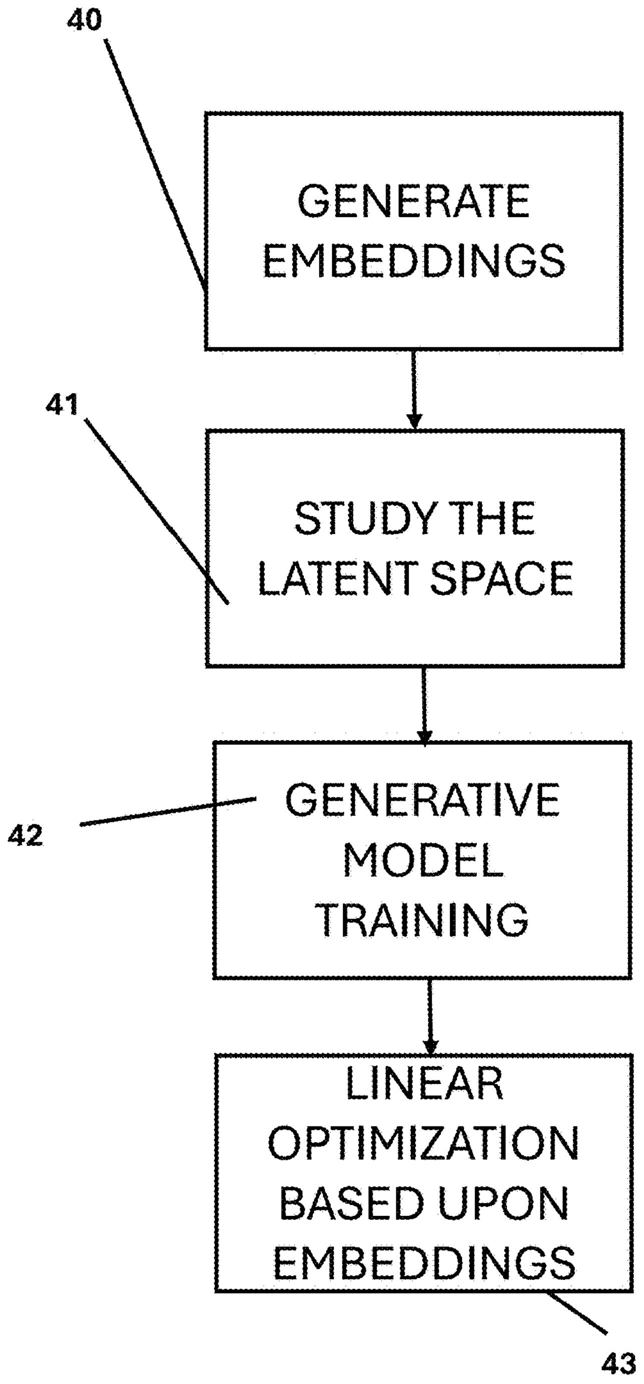
FIG. 4 is a flow diagram showing operation of a statistical layer according to an embodiment of the invention.

FIG. 4 is a flow diagram showing operation of a statistical layer according to an embodiment of the invention. Embodiments of the invention comprise an embeddings based approach to rearrange or create new access levels and roles, in which the a process is applied the includes generating embeddings 40, studying the latent space 41, generative model training 42, and linear optimization based upon the embeddings 43.

The statistical layer is discussed in greater detail as follows:

Generate Embeddings. Use embedding techniques, e.g. Word Embeddings or Neural Embeddings, to represent access levels/job roles in a high-dimensional space. This creates vector representations that capture the relationships between different access levels or job roles respectively. Embeddings capture intricate relationships and nuances that may not be adequately represented in lower-dimensional spaces and are useful in finding insights such as semantic similarity which provide more precision while executing linear optimization and performing similarity analysis.

Study the latent space. Use the embedded representations to explore the latent space. This involves analyzing the relationships between access levels and job roles to identify patterns and clusters. Visualization tools such as t-SNE or PCA can help in understanding the structure of the latent space.

Generative Model Training. Generative model, e.g. Generative Adversarial Network or Variational Autoencoder, learns the underlying patterns in the data and generates new configurations of access levels and job roles leveraging the similarity between the access levels and job roles respectively as the basis. The model is fine-tuned guided with the samples of the ideal desired output for better accuracy.

Linear Optimization based upon embeddings. Linear optimization involves defining objective function, i.e. minimize abandoned access levels and job roles, defining constraints such as job role requirements, access group dependencies, and limitations on the number of access levels an individual can have, formulate the model and solve it. The method enhances physical security, employing access for nuanced alignment and optimal use.

Architecture

Figure 5:
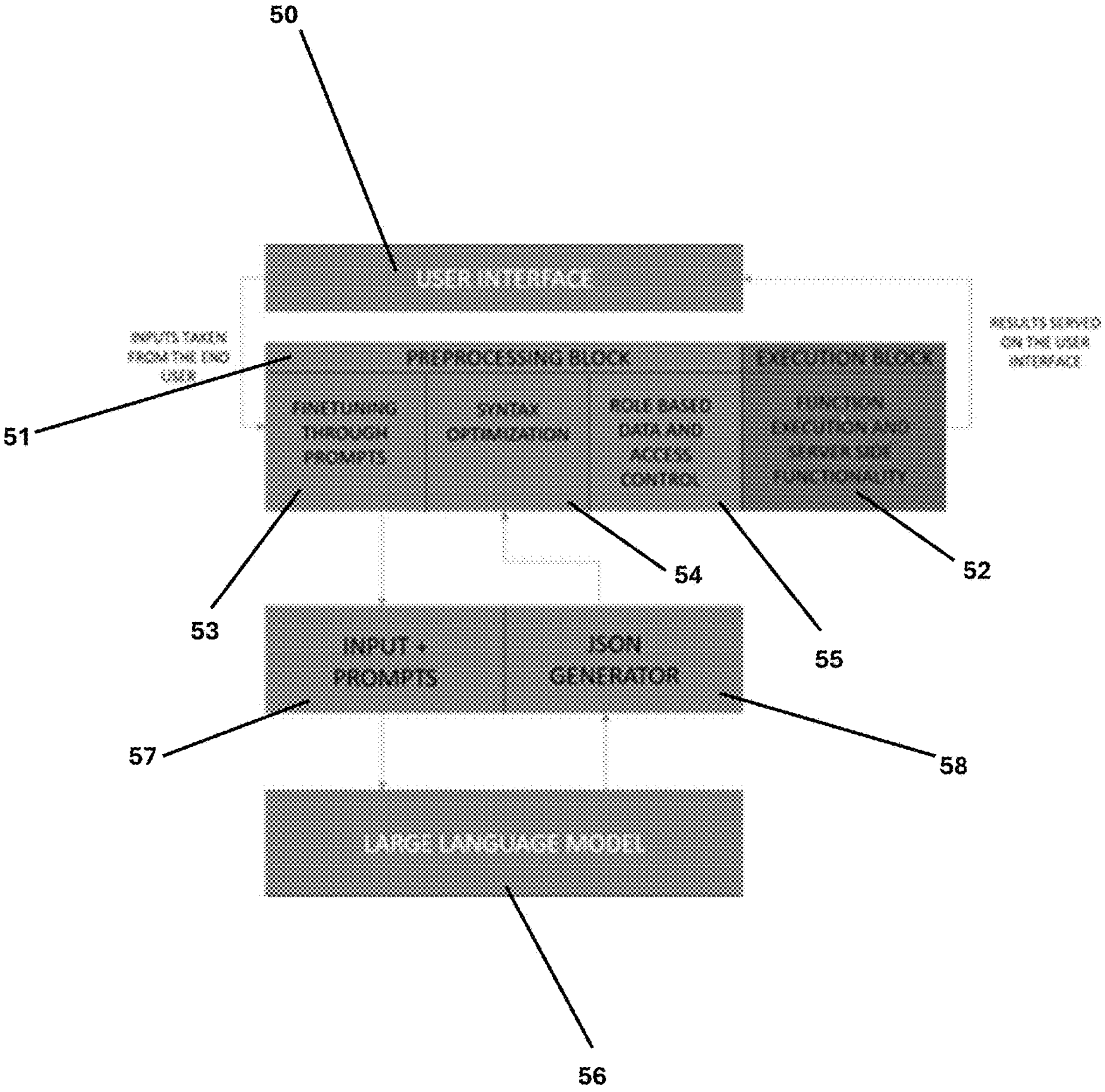
FIG. 5 is a block diagram that shows an adaptive language model-based solution for interactive security and safety with data privacy according to an embodiment of the invention.

FIG. 5 is a block diagram that shows an adaptive language model-based solution for interactive security and safety with data privacy according to an embodiment of the invention. The end user can access the user interface 50 and provide inputs in the form of natural language text, voice, or image, e.g. via a search bar, submit button, a display areas, etc. The inputs taken from the user is processed by a preprocessing block 51, which in embodiments of the invention may be an internal application which can operate on premises or over the cloud based upon user preference. The preprocessing block interacts with a module 57 that passes inputs and prompts to a large language model 56. The preprocessing block also interacts with a JSON generator 58 to receive responses from the large language model.

Embodiments of the invention leverage large language models to instruct a software program or system which is meant to be invoked by a particular syntax, e.g. software is invoked by a function or method, e.g. an SQL database is invoked by an SQLquery. In an input to the LLM the user provides a list of functions/sql queries/syntax along with the text in the form of prompts to support the LLM model to adapt to the proprietary information and syntax. The LLM model, which is fine tuned with the information provided, as explained below, then generates an output in the form of components of the function/query/syntax, e.g. name of function, attributes in the function and any other values which are relevant to invoke the functionality that function is responsible for in the intended software.

Once the LLM returns the information in the form of a JSON file, it is reviewed for any kind of noise, i.e. typos or other kind of issues. This block of the solution is referred to as syntax optimization 54 and involves looking for potential issues in the representation of the function and attribute names as well as any missing values where a potential resource deadlock may arise while executing the functionality in later stages.

Once the deficiencies are identified and removed in the syntax of the function generated by the LLM, the feasibility of execution is decided by role based data and the access control block 55. This block makes sure that any resources involved in the execution of the function are legitimately entitled to be accessed by the user who is accessing the entire solution through the user interface (UI). In case the user is not authorized a message stating the same is shown at the UI, else the function syntax is sent to the next stage, i.e. function execution and server side functionality block 52 (short form execution block).

The information received by the execution block is used to trigger the respective function and its dependencies. The function could be responsible for a functionality such as, e.g.

- 'block access of an identity for four hours,'
- 'grant access of a particular access level to the mentioned badge id,'
- 'show how many people are present in the facility right now,'
- 'who all are accessed VPN last night,' and so on.

On executing the function the final output is shown on the UI in a seamless way making sure that the user has to submit only natural language inputs and receive functionality or information in return based upon authorization of the user's role.

Inputs and prompts to the large model are generated when preprocessing block performs hard fine tuning 53 on a syntactical data example SQL queries. As shown in the examples above, the text and corresponding SQL queries are fed into the training data through which the AI models learn various table names, column names, and their relations with each other to generate an SQL query on a text which could be very new for it but is intended for same table, column, and syntax structure.

The following is a sample input for training (see also FIG. 3 above):

```
Input1)
Text: List all the employees present in the building123
SQL: SELECT * FROM employees WHERE building = 'building123';
Input2)
Text: Show all visitors who have not mentioned the purpose of visit today
SQL: SELECT * FROM visitors WHERE visit_date = CURRENT_DATE
AND purpose_of_visit IS NULL;
```

The sample question which is not part of the training data to the model but involves same columns/tables is:

Text: How many visitors do we have today.

in the above example the model returns following result as it now understands which table and column to refer to:

SELECT COUNT(*) FROM visitors WHERE visit_date=CURRENT_DATE

Those skilled in the art will appreciate that this example is provided for illustration purposes. The same concept can be used to create more complex text and SQL pairs, which would make the model more robust for variety of scenarios.

The preprocessing block sends the user input to the large language model and receives the output from it, which is syntax, e.g. an SQL query. The SQL query is then smoothened via a syntax optimization module 34 through one or more natural language processing algorithms which are executed inside the application to improve the accuracy further The preprocessing block-checks for the accuracy of the column and table names for them to match with the actual DDL information in the database. This can happen in cases where not enough training data is supplied to the model and it hallucinates while generating the output. One such example is as follows:

```
Text: Show me how many visitors we have today
SQL generated by model: SELECT COUNT(*) FROM visitor
WHERE visit_date = CURRENT_DATE;
```

In the above example the query generated by the model is calling information from the table named visitor while the actual table name is visitors. The preprocessing block looks for any deficiencies leveraging library of rules and change the table name from visitor to visitors in this case. The performance of the preprocessing block is dependent upon user feedback and can be improved over time by adding more logic for the identified issues in the past through testing of the generated SQL queries by the model.

In the query smoothening stage the following occurs:

In case a schema name, table name, or column name is returned by the large language model which does not exist in the internal database, the system predicts the closest name and makes the correction in the query before firing it on the database. Embodiments of the invention may include rule based preprocessing or use predictive algorithms such as named entity recognition to have the predictive capability as mentioned here. The purpose of this block is to improve the bottom line accuracy of the generated SQL queries or structured instructions.

Embodiments of the invention use text similarity algorithms for this purpose, e.g.:

If the returned outcome is select*from dbschema.event but the table event does not exist while there is another table called events_data, the query smoothening algorithm returns the following result:

select*from dbschema.events_data.

The final query reads the data from the database and returns it to the user interface. This is done through the execution block shown in the element 32 of FIG. 3. This block makes sure to execute the instruction which is an SQL query in this case. The steps involve reading data from database, parsing it to be shown on the user interface, and sending it to the user interface. Then user interface displays the data to the user in the predefined application UI layout.

A role based data and access control module 35 verifies if the end user has permission to access the requested data before rendering it. To achieve this embodiments of the invention use role based access control policies where a particular user is assigned roles. These roles further have access to limited assets and database tables as per the policy which makes sure that everyone has just enough access to fulfil their duties and if there is something a user is requesting which they do not need for their work they are denied access for it.

After role and access control considerations are applied, the execution block 32, which implements function execution and server side functionality, serves the results of the process to the user via the user interface.

Definitions of the terms used in FIGS. 1 and 3 are as follows:

Hard Fine Tuning. This module trains the large language model on the syntax components, for example table names, field names, etc. and the natural language associated with using those components. This can be achieved by retraining the last layer of LLM neural network or simply by using an approach such as few shot learning, which is a type of machine learning method where the training dataset contains limited information. The common practice for machine learning applications is to feed as much data as the model can take. This is because in most machine learning applications feeding more data enables the model to predict better. However, few shot learning aims to build accurate machine learning models with less training data.

FIG. 3 discussed above shows a sample fine tuning exercise through few shot learning.

As noted, few shot learning involves providing a very limited set of labelled data examples and using the original general purpose model for the desired use cases, e.g. to generate SQL.

The input prompts are designed to channelize the output strictly to perform only a desired task and nothing else.

Query Smoothening. To improve the bottom line of accuracy of the system, the query set or syntax which Is then returned by the large language model is further improved in this step by leveraging natural language processing techniques.

In query smoothening stage embodiments of the invention primarily do following:

In case there is a schema name, table name, or column name is returned by the large language model which does not exist in the internal database, embodiments of the invention predict the closest name and make the correction in the query before firing it on the database.

Embodiments of the invention use text similarity algorithms for this purpose, e.g.:

If the returned outcome is select*from dbschema.event but the table event does not exist while there is another table called events_data, the query smoothening algorithm will return following result:

select*from dbschema.events_data.

Processing of results based on user roles. This step authenticates the user and their roles to make sure that the user is accessing the data for which they are authorized.

While the discussion herein relates to security applications, embodiments of the invention are applicable to other industries, as well taking analogy at the scientific concept level. In such embodiments of the invention, some of the many possible real world use cases are as follows:

- Security manager in an organization asking this system "Give me list of visitors have entered in building 'ABC' in last 2 hours" to get a list of the visitors;
- Chief Security officer asking the system "what are the top incidents according to severity in last 24 hours in my organization from across the globe" to get details; and
- Security operations manager instructing the system "If you see any alarm related to physical access control systems for San Francisco location in next 1 week, immediately send an email to security group responsible to tackle it" or "block the access of employee 'XYZ' for next 4 hours and send an email to their manager about the recent incident they were involved into."

Similarly, embodiments of the invention apply to any scenario where an insight or action is requested from the system and it acts accordingly.

Although embodiments of the invention can process requests while interacting with the end user, large language models, and other internal systems of the organization, such embodiments can be hosted in a controlled environment as per the security requirements of the organization, which ensures that the organization has control over the critical actions and the actual data, therefore, is not exposed to the large language models.

For Example:

- Jane is a sales manager and has access to the sales data while the question asked by Jane is "Show me email ids of all the people in my organization" The system does not show this data to Jane per the role based access control policy Additional embodiments of the invention include, e.g.:

- Automating security operations center operations using large language model's intelligence;
- Improving human computer interface through a natural language interface enabled system which can talk to a machine and keep desired data and insights ready all the times as per request;
- Leveraging large language models to take action on the system and use data without exposing actual data to the models, i.e. sharing only metadata and process the instructions shared by models in another silo; and
- Intelligent decision support system and virtual assistant for different personas which can answer queries and take actions as instructed by the humans without involving any other human being in the process, thus maintaining the integrity of the process.

Computer Implementation

Figure 6:
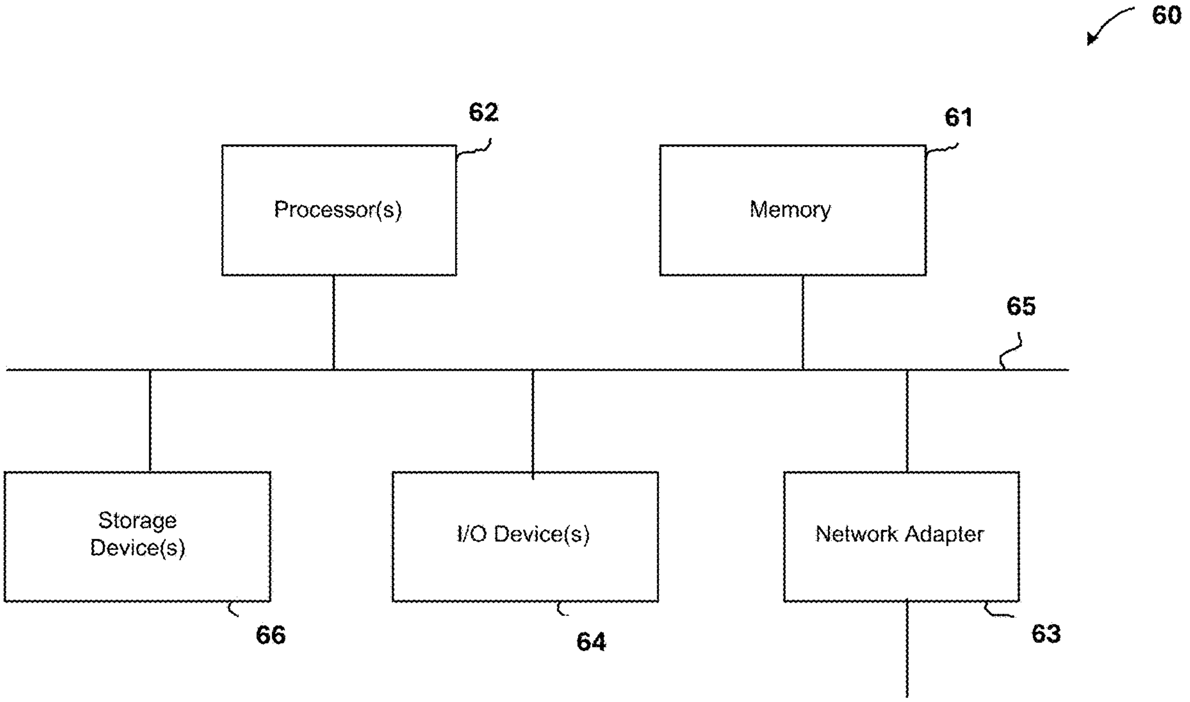
FIG. 6 is a block diagram of a computer system as may be used to implement certain features of some of the embodiments.

FIG. 6 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 60 may include one or more central processing units ("processors") 62, memory 61, input/output devices 64, e.g. keyboard and pointing devices, touch devices, display devices, storage devices 66, e.g. disk drives, and network adapters 330, e.g. network interfaces, that are connected to an interconnect 65. The interconnect 65 is illustrated as an abstraction that represents any one or more separate physical buses, point to point connections, or both connected by appropriate bridges, adapters, or controllers. The interconnect 65, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 61 and storage devices 66 arc computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 61 can be implemented as software and/or firmware to program the processor 62 to carry out actions described above. In some embodiments, such software or firmware may be initially provided to the processing system 60 by downloading it from a remote system through the computing system 60, e.g. via network adapter 63.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for using natural language to instruct a software program or system, comprising:

providing a large language model (LLM) with a list of functions, queries, or syntax elements associated with the software program or system, along with text prompts to support the LLM in adapting to proprietary information and syntax;

receiving, from the LLM, an output of a JavaScript Object Notation (JSON) file specifying components of a function, query, or syntax element relevant to invoking a desired functionality within the software program or system;

reviewing the JSON file for potential errors or omissions in function/attribute names or values to ensure correct execution;

performing role-based data and access control to verify the user's authorization to access resources involved in the execution of the generated function, query, or syntax element;

if the user is authorized, executing the generated function, query, or syntax element within the software program or system to achieve the desired functionality; and displaying an output of the execution of the generated function on a user interface and/or taking the action based upon the executing outcome.

2. The method of claim 1, wherein using the large language model output used to execute the generated function comprises automating security operations center operations.

3. The method of claim 1, further comprising:

adapting said large language model for a private application, said private application comprising an enterprise.

4. The method of claim 1, said taking the action based upon the executing outcome further comprising:

providing situational awareness to tackle security and safety challenges while managing data privacy of end users, wherein said situational awareness helps security personnel understand security status of an entire organization and identify problems, abnormalities, and insights on other aspects in real time to mitigate potential security or safety hazards.

5. The method of claim 1, said taking the action based upon the executing outcome further comprising:

automatically detecting a location of each end user from their browser or machine data;

propagating said query through all enterprise information; and determining a geographically appropriate response.

6. The method of claim 5, said response comprising:

taking real time actions or providing real time insights when emergency evacuation is required from a building.

7. The method of claim 1, said user interface further comprising:

a chat interface which receives end user inputs in any of text, audio, or images and which generates end user outputs in any of text, speech, or interactive chats.

8. A method for providing interactive security and safety with data privacy, comprising:

providing an adaptive language model in which an end user accesses a user interface and provides inputs of natural language text, voice, or images;

processing said inputs received from the end user with a preprocessing block;

passing said inputs and prompts to a large language model (LLM) to instruct a software program or system which is meant to be invoked by a particular syntax, wherein said input to the LLM provides a list of functions/SQL queries/syntax along with text in the form of said prompts to support the LLM model to adapt to proprietary information and syntax;

fine tuning the LLM with information provided to generate as an output components of the functions/SQL queries/syntax which are relevant to invoke a functionality that a function is responsible for in an intended application;

receiving responses from the LLM and processing said responses with a JavaScript Object Notation (JSON) generator;

performing syntax optimization by identifying potential issues in representations of function and attribute names, as well as any missing values where a potential resource deadlock arises while executing functionality in later stages;

once deficiencies are identified and removed in a syntax of the functions generated by the LLM, determining feasibility of execution with role based data and access control to confirm that any resources involved in execution of the function are legitimately entitled to be accessed by the end user who is requesting access through the user interface;

wherein when the end user is not authorized, showing a message at the user interface, else forwarding the syntax of the functions for function execution;

using information received to trigger a respective function and its dependencies;

when executing said function, showing a final output on the user interface, wherein the user only submits natural language inputs and receives functionality or information in return based upon authorization of a role of the user.

9. The method of claim 8, further comprising:

performing hard fine tuning on syntactical data example SOL queries to generate Inputs and prompts to the large model, wherein text and corresponding SOL queries are fed into training data through which the large language model learns table names, column names, and their relations with each other to generate an SOL query on a text which is potentially new but is intended for the same table, column, and syntax structure.

10. The method of claim 8, further comprising:

using syntax optimization via one or more natural language processing algorithms to smoothen said query, wherein a query smoothening stage comprises leveraging natural language processing techniques;

predicting a closest name and making a correction in the query before executing the query when a schema name, table name, or column name is returned by the large language model which does not exist in an internal database;

using text similarity algorithms to predict a closest name and making a correction in the query to create a final query to be executed when a schema name, table name, or column name which does not exist in an internal database is returned by the large language model; and using said final query to read data from a database and return said data to the user interface.

11. The method of claim 8, further comprising:

performing role based data and access control to verify when the end user has permission to access requested data before rendering said data;

using role based access control policies where a particular user is assigned roles;

wherein said roles provide access to limited assets and database tables as per said access control policies;

wherein each user has sufficient access to fulfil their duties; and wherein when a user is denied access when requesting to assets and database tables which they do not need to fulfil their duties.

* * * * *